(12) United States Patent
Chang et al.

(10) Patent No.: US 10,119,005 B1
(45) Date of Patent: Nov. 6, 2018

(54) METHOD FOR RECOVERING, REGENERATING AND REPAIRING POLYMER

(71) Applicant: Southwest University of Science and Technology, Mianyang (CN)

(72) Inventors: Guanjun Chang, Mianyang (CN); Li Yang, Mianyang (CN); Zhongyuan Lu, Mianyang (CN); Junxiao Yang, Mianyang (CN)

(73) Assignee: Southwest University of Science and Technology, Mianyang (CN)

( * ) Notice: Subject to any disclaimer, the term of this patent is extended or adjusted under 35 U.S.C. 154(b) by 0 days.

(21) Appl. No.: 15/883,795

(22) Filed: Jan. 30, 2018

(30) Foreign Application Priority Data

Jun. 6, 2017 (CN) .......................... 2017 1 0417121

(51) Int. Cl.
| | |
|---|---|
| *C08J 11/16* | (2006.01) |
| *C08J 7/14* | (2006.01) |
| *C08L 61/34* | (2006.01) |
| *C08J 7/12* | (2006.01) |

(52) U.S. Cl.
CPC .............. *C08J 11/16* (2013.01); *C08J 7/123* (2013.01); *C08J 7/14* (2013.01); *C08L 61/34* (2013.01); *C08J 2361/34* (2013.01)

(58) Field of Classification Search
USPC .......... 521/40; 528/481, 492, 495, 498, 501
See application file for complete search history.

(56) References Cited

U.S. PATENT DOCUMENTS

| | | | | |
|---|---|---|---|---|
| 3,041,318 A | * | 6/1962 | Hess | C08J 3/09 260/DIG. 22 |
| 3,258,453 A | * | 6/1966 | Chi | C08F 6/24 526/346 |
| 3,268,501 A | * | 8/1966 | Crouch | C08C 2/06 528/487 |
| 3,553,248 A | * | 1/1971 | Wakita et al. | C08F 6/16 558/463 |
| 3,579,630 A | * | 5/1971 | Herz et al. | A61K 8/817 424/47 |
| 3,590,026 A | * | 6/1971 | Carlson et al. | C08C 2/06 159/16.3 |
| 3,751,402 A | * | 8/1973 | Broering | C08C 2/06 159/DIG. 10 |
| 2010/0133192 A1 | * | 6/2010 | Liu | B01D 53/228 210/654 |
| 2012/0329977 A1 | * | 12/2012 | Bell | B01D 15/166 528/196 |

* cited by examiner

*Primary Examiner* — Terressa Boykin
(74) *Attorney, Agent, or Firm* — IP Law Leaders PLLC (57) ABSTRACT

A method for recovering, regenerating and repairing polymer. The method includes immersing a polymer in an acid solution so that hydrogen ions of the acid solution replace metal cations of the polymer to obtain an acid-treated polymer, and to realize the recovery of the polymers. Subsequently, the acid-treated polymer is immersed in an alkaline solution to obtain a base-treated polymer to realize the regeneration of the polymers. The polymer is composed of disulfonate-difluorobenzophenone, hydroxyindole and difluorobenzophenone as monomers, and sulfonate groups of the disulfonate-difluorobenzophenone have metal cations. The method replaces the metal cations with hydrogen ions to realize the recovery of the polymers and reduce environmental pollutions. The regeneration of polymers is realized by replacing the hydrogen ions with the metal cation, and resource recycling. Through the process of local repair, the service life of the product of polymers can be prolonged.

20 Claims, 6 Drawing Sheets

METHOD FOR RECOVERING, REGENERATING AND REPAIRING POLYMER

CROSS-REFERENCE TO RELATED APPLICATION

The present application claims priority from China Patent Application No. 201710417121.X, filed on Jun. 6, 2017, in the State Intellectual Property Office of P. R. China, the disclosure of which is incorporated herein in its entirety by reference.

TECHNICAL FIELD

One or more embodiments described herein relate to the field of polymer materials, and more particularly, to a method for recovering, regenerating and repairing a highly thermosetting polymer.

BACKGROUND

High performance polymers have good thermal and mechanical properties, which are widely used in aerospace, microelectronics, precision machinery, medical equipment and other fields, and show great application prospects and huge commercial value. In recent years, with the fast development of the national economy, the traditional high-performance polymer materials do not meet the needs of a wider range of applications any more, thereby requiring polymer materials to have more excellent thermal stability, mechanical strength, anti-cracking properties and other properties.

Cross-linking between polymer chains can further improve the performance of high performance polymers, and obtain a polymer with ultra-high performance. Even if the thermal stability and mechanical strength of polymers can be further enhanced by chemical cross-linking, cross-linked polymers are difficult to recycle and cannot be recast. As a result, the waste materials can only be treated with the waste landfill. With the increase in demands for polymers with high performance or ultra-high performance, handling of high performance polymer materials through recovering and recycling are a common problem faced by the modern society.

SUMMARY

Accordingly, the embodiment is directed to solving at least one of the aforesaid problems of the conventional art. For example, one aspect of the embodiment is to achieve the recovery of a polymer. To achieve the above aspect, the embodiment provides a method of recovering a polymer, the method obtains an acid-treated polymer by immersing a polymer in an acid solution, so that hydrogen ions of the acid solution replace metal cations of the polymer, wherein the polymer is composed of disulfonate-difluorobenzophenone, hydroxyindole and difluorobenzophenone as monomers, and the sulfonate groups of the disulfonate-difluorobenzophenone have metal cations; or the polymer has a structural formula as shown below:

Specifically, ⊕ represents a metal cation, m is in the range of 1~100, and n is in the range of 200~400.

The metal cation in the aforementioned aspect can be an alkali metal cation. For example, the alkali metal cation can be selected from $K^+$, $Na^+$ and/or $Li^+$, with $K^+$ as the preference. Also, the polymer in the aforementioned aspect can be a cross-linked structure, which is achieved by the interaction between metal cations and π-face of indole groups.

During the process of immersing the polymer in the acid solution, the polymer is neither oxidized nor corroded as to achieve the regeneration of the polymer.

According to another aspect of the embodiment, a method of regenerating a polymer is comprised of the following steps: immersing a polymer in an acid solution so that hydrogen ions of the acid solution replace metal cations of the polymer to obtain an acid-treated polymer; immersing the acid-treated polymer in an alkaline solution to obtain a base-treated polymer, wherein the polymer is composed of disulfonate-difluorobenzophenone, hydroxyindole and difluorobenzophenone as monomers, and the sulfonate groups of the disulfonate-difluorobenzophenone have metal cations, and the polymer has a structural formula as shown below:

Specifically, ⊕ represents a metal cation, m is in the range of 1~100, and n is in the range of 200~400.

The metal cation in the above-stated aspect may be an alkali metal cation. For example, the alkali metal cation may be selected from $K^+$, $Na^+$ and/or $Li^+$, with $K^+$ as the preference. Also, the polymer in the above-stated aspect can show a cross-linking structure, which is achieved by the interaction between metal cations and π-face of indole groups.

During the process of immersing the polymer in the acid solution, the polymer is neither oxidized nor corroded. Also, the alkali solution includes one or more compound selected from sodium hydroxide, potassium hydroxide, lithium hydroxide, rubidium hydroxide and cesium hydroxide.

Still another aspect of the embodiment is to achieve the repairing of a polymer. To achieve the above aspect, a method of repairing a polymer is comprised of the following steps: immersing damaged parts of a polymer in an acid solution, so that hydrogen ions in the acid solution replace metal cations of the damaged parts of the polymer; subsequently dissolved the damaged parts of the polymer in an organic solvent, and the damaged parts of the polymer heals after the organic solvent evaporation; Finally, the damaged parts of the polymer can be repaired by soaking in an alkaline solution, wherein the polymer is composed of disulfonate-difluorobenzophenone, hydroxyindole and difluorobenzophenone as monomers, and the sulfonate groups of the carbonylbis(2-fluorobenzenesulfonate) have metal cations, or the polymer has a structural formula as shown below:

Specifically, ⊕ represents a metal cation, m is in the range of 1~100, and n is in the range of 200~400.

The metal cation in the above aspect can be an alkaline metal cation. For example, the alkali metal cation may be selected from $K^+$, $Na^+$ and/or $Li^+$, with $K^+$ as the preference. Also, polymer may be shows cross-linking structures, which is achieved by the interaction between metal cations and n-face of indole groups.

During the process of immersing the polymer in the acid solution, the polymer is neither oxidized nor corroded. Also, the alkali solution can include one or more compound which selected from sodium hydroxide, potassium hydroxide, lithium hydroxide, rubidium hydroxide, and cesium hydroxide.

According to still another aspect of the embodiment, the organic solvent maybe includes one or more compound which selected from dimethylacetamide, dimethylformamide, N-methyl-2-pyrrolidone, Tetrahydrofuran.

Compared to the conventional art, the beneficial effects of the embodiment relate to methods of recovering, regenerating or repairing a polymer include advantages such as ease in operation and implementation pertinent and significant to high industrialization. The embodiment can achieve the recovery of polymers by replacing the metal cations with hydrogen ions to reduce environmental pollutions. The regeneration of polymers is realized by replacing the hydrogen ions with the metal cation, and recycling of resources. Through local repair, the service life of the product of polymers can be prolonged. After regeneration treatment and repairing treatment, polymers can be restored to a level comparable to their original mechanical properties.

DETAILED DESCRIPTION

In the following detailed description, the methods for recovering, regenerating and repairing of a polymer will be illustrated with reference to one or more exemplary embodiments and drawings described below.

In an exemplary embodiment, a method of recovering a polymer may include: immersing the polymer in an acid solution for acid treatment so that metal cations of the polymer are replaced with hydrogen ions of the acid solution, followed by washing with deionized water several times and then drying in vacuum to obtain an acid-treated polymer.

In another exemplary embodiment, a method of regenerating a polymer may include the following steps of: immersing the polymer in an acid solution for acid treatment, so that the metal cations of the polymer are replaced with hydrogen ions of the acid solution, followed by washing with deionized water several times and then drying in vacuum to obtain an acid-treated polymer. The acid-treated polymer is immersed in an alkaline solution, followed by washing with deionized water several times and then drying in vacuum to obtain a base-treated polymer.

In yet another exemplary embodiment, a method of repairing a polymer may include the following steps of: immersing damaged parts of a polymer in an acid solution, so that the metal cations of the damaged parts of the polymer are replaced with hydrogen ions of the acid solution; placing droplets of organic solvents on the damaged parts of the polymer to dissolve the damaged parts of the polymer, and the internal structure of the damaged parts of the polymer rearranged as a result of diffusion action, thus the damaged parts heals upon solvent evaporation; the damaged parts of the polymer can be repaired by immersing in an alkaline solution. Wherein, the organic solvent may include one or more selected from dimethylacetamide, dimethylformamide, N-methyl-2-pyrrolidone, Tetrahydrofuran, but the embodiment is not limited thereto, and other organic solvents which may provide an environment for dissolving polymer or damaged parts of polymer which after acid treatment may be used.

In the method of recovering, regenerating or repairing a polymer according to the exemplary embodiment, immersing the polymer or the damaged parts of the polymer in an acid solution to replace the metal cations of the polymer or the damaged parts of the polymer with hydrogen ions of the acid solution. Thus, the recovery process of the polymer can be simply described as: by replacing the metal cations of the sulfonate groups of the polymer with hydrogen ions of the acid solution. Acid treatment process does not depend on the types of acids, as long as not an oxidizing or corrosive acid, it can be a dilute sulfuric acid, a dilute nitric acid, a dilute hydrochloric acid and so on.

The term "not an oxidizing or corrosive acid" in the present application means that the acid solution neither oxidizes nor corrodes the polymer or the damaged parts of the polymer during the immersion of the polymer or the damaged parts of the polymer. Furthermore, the pH of the acid solution may range from 1.0 to 6.5, but the range of the pH of the acid solution of the embodiment is not limited thereto. When the pH of the acid solution is high, the immersion time of the polymer in the acid solution can be prolonged; while the pH of the acid solution is small, the immersion time of the polymer in the acid can be shortened.

In the method of recovering, regenerating or repairing a polymer, after acid treatment or alkaline treatment, the polymer can be washed with deionized water, which is mainly to remove impurities (such as acid solution, alkaline solution) on the surface of the polymer; and also can be dried in vacuum, which is mainly to remove the solution on the surface of the polymer and to prevent oxidation of the polymer during drying, but the embodiment is not limited thereto.

In the method of regenerating and repairing a polymer according to the exemplary embodiment, the polymer or the damaged parts of the polymer can be immersed in an alkaline solution, the pH of the alkaline solution may range from 7.5 to 13, but the range of the pH of the alkaline solution of the embodiment is not limited thereto. When the pH of the alkaline solution is high, the immersion time of the acid-treated polymer or the damaged parts of the polymer which after acid treatment in the alkaline solution can be shortened; while the pH of the alkaline solution is small, the immersion time of the acid-treated polymer or the damaged parts of the polymer which after acid treatment in the alkaline solution can be prolonged. Due to the types of metal cations can influence the choice of alkaline solutions, and the metal cations acting as cross-linking sites of polymers, therefore, the type of alkali solution affects the mechanical properties of the polymer. During the process of regenerating and repairing of a polymer, the process of immersing the polymer into the alkaline solution can be described as: by replacing hydrogen ions of the acid solution with the metal cations of the sulfonate groups of the polymer to realize the regeneration and repairing of the polymer.

In the method of recovering, regenerating and repairing a polymer, the polymer is one based on the cation-π interaction, and the polymer can be composed of disulfonate-difluorobenzophenone, hydroxyindole and difluorobenzophenone as monomers, and the sulfonate groups of the disulfonate-difluorobenzophenone have metal cations. Wherein, the metal cation may be an alkaline metal cation. For example, the alkali metal cation may be selected from $K^+$, $Na^+$ and/or $Li^+$, and more preferably with $K^+$. The polymer may have cross-linking structures, which take the interaction between metal cations and n-face of indole groups as the cross-linking sites.

The polymer, which has the chemical name of sulfonated poly(aryl indole ketone)s (SPAIKs), corresponds to a structural formula (1) as shown below:

Specifically, ⊕ represents a metal cation, m is in the range of 1~100, and n is in the range of 200~400.

The metal cation may be an alkaline metal cation. For example, the alkali metal cation may be selected from $K^+$, $Na^+$ and/or $Li^+$, more preferably may be $K^+$. The polymer can have cross-linking structures, which take the interaction between metal cations and π-face of indole groups as the cross-linking sites.

In the exemplary embodiment, the polymer may have various shapes and sizes. The desired shapes and sizes of polymer can be obtained by casting the polymer powder. For example, the polymer powder can be dissolved in DMSO and cast onto a slide through a membrane filter, and then the polymer films were obtained. At room temperature, the resulting films are semi-transparent, non-tacky solids. However, the embodiment is not limited thereto.

For convenience of description, the exemplary embodiment is described below with m/(m+n)=20% polymer as an example, but is not limited thereto.

Polymers have cross-linking structures, wherein, the cross-linking sites of the cross-linking structures appear between metal cations and indoles, that is, the existence of the cross-linking structures is due to the cation-x interactions between metal cations and x-face of indoles. The existence of the cation-n interactions can improve the mechanical properties of polymers, so that polymers have high thermosetting properties. Since the cross-linking sites appear between metal cations and indoles, while different metal cations have different electronic structures and atomic radius, so the types of metal cations can influence the mechanical properties of the polymer films.

Figure 1:
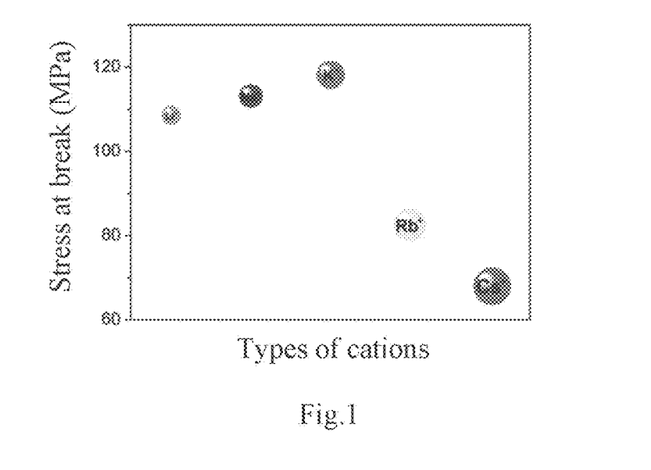
FIG. 1 shows the stress at break of acid-treated polymer by alkaline solutions with different types of metal cations at pH=12 for 4 h.

The complexation ability of the π-face of aromatic structures with the alkaline metal cation should follow the Eisenman class IV sequence, $K^+ \approx Rb^+ \approx Cs^+ > Na^+ > Li^+$. In practice, however, the mechanical strength (stress at break) of the polymer in this application was not directly relative to the complexation energy, that is, was not satisfy the Eisenman class IV sequence, as shown in FIG. 1. Specifically, FIG. 1 shows the stress at break of acid-treated polymer by alkaline solutions with different types of metal cations at pH=12 for 4 h. From FIG. 1, it is only true for comparation of $K^+$, $Na^+$, and $Li^+$. This can be interpreted as during the process of polymer synthesis, the diffusion of the larger alkaline metal cations (e.g., Rb+ and Cs+) to replace protons of sulfonate groups in solution. To a large extent, the diffusion of the larger alkali metal cations is hindered in the polymer bulk when soaking, resulting in a reduction in the number of cation-π interactions that act as cross-linking sites, leading to a pronounced decrease in the values of stress at break. Therefore, for the present application the metal cations of polymers are preferably alkaline metal cations, more preferably $K^+$, $Na^+$ and/or $Li^+$, and still more preferably $K^+$.

When polymers based on the cation-n interactions are immersed in an acid solution, the metal cations of polymers are replaced by protons, that is, the cation-π interactions and the cross-linking structures of polymers disappear, and leading to a decrease in the mechanical properties of polymers. This can be used to solve the problem that the high-performance thermosetting polymer is difficult to recover and reduce the environmental burden.

Since the acid-treated polymers can be dissolved in the organic solvent, the structure of polymers can be rearranged by the diffusion, and then be reconstructed by alkaline treatment, thereby repairing and regenerating the material formed by polymers.

In another exemplary embodiment, the preparation of polymers which composed of disulfonate-difluorobenzophenone (the sulfonate groups of the disulfonate-difluorobenzophenone have metal cations), hydroxyindole, and difluorobenzophenone as monomers can be carried out by following ways: S01 the metal cations react with disulfonate-difluorobenzophenone solution to precipitate sulfonated components, wherein, metal cations are present on the sulfonate groups of the sulfonated components.

In particular, the metal cations may be derived from metal hydroxides, metal salts, and the like. Metal salts may be alkaline metal salts which are not oxidizable, for example, alkaline chlorides, alkaline carbonates and alkaline nitrates. In addition, disulfonate-difluorobenzophenone solution can be obtained by carrying out a sulfonation reaction of difluorobenzophenone.

With sodium cations as an example, the reaction process for the synthesis of the sulfonated components can be as shown in formula (2). Of course, potassium cations can also be used as the cations, the reaction process only need to change Na in formula (2) to K.

S02 Under inert gas atmosphere, the sulfonated components, the hydroxyindoles, and the difluorobenzophenones are mixed in an organic solvent, and heated to carry out the reaction to obtain SPAIKs.

In another exemplary embodiment, the preparation of SPAIKs polymers can also be obtained by the following steps: Synthesis of disodium 3,3'-disulfonate-4,4'-difluorobenzophenone: dissolved the 4,4'-difluorobenzophenone into the sulfonating agent solution to carry out a sulfonation reaction. Sodium hydroxide (NaOH) was added to neutralize the solution. Then excess sodium chloride is added to form the disodium 3,3'-disulfonate-4,4'-difluorobenzophenone precipitate.

Synthesis of SPAIKs: Under inert gas atmosphere, 4-hydroxyindoles, 4,4'-difluorobenzophenones, disodium 3,3'-disulfonate-4,4'-difluorobenzophenones are mixed in an organic solvent, and heated to carry out the reaction with stirring to obtain SPAIKs. But the synthesis methods of SPAIKs are not limited to the methods described herein In particular, the inert gas may be nitrogen, but the embodiment is not limited thereto. The organic solvent may be dimethyl sulfoxide (DMSO), but the embodiment is not limited thereto, and other organic solvents which may provide a dissolved environment may be used. The temperature of heating is appropriate that the reaction can be carried out without destroying the organic components. For example, the heating temperature may be controlled within the range of 150° C.~200° C., but the embodiment is not limited thereto.

In the steps of preparing the polymer, the ratio of the sulfonated component, the hydroxyindole, and the difluorobenzophenone (for example, 4-hydroxyindole, 4,4'-difluorobenzophenone, disodium 3,3'-disulfonate-4,4'-difluorobenzophenone) can be adjusted as long as the polymer can be obtained. For example, in order to improve the utilization of raw materials, the molar ratio of the sulfonated component to the difluorobenzophenone (or disodium 3,3'-disulfonate-4,4'-difluorobenzophenone to 4,4'-difluorobenzophenone) may be 1:(1~10), and the molar ratio of the hydroxyindole to the difluorobenzophenone (or 4-hydroxyindole to 4,4'-difluorobenzophenone) may be (1.1~2.0):1, but the embodiment is not limited thereto. Also, the molar ratio of the sulfonated component to the difluorobenzophenone (or disodium 3,3'-disulfonate-4,4'-difluorobenzophenone to 4,4'-difluorobenzophenone) may be 1:(3~7), and the molar ratio of the hydroxyindole to the difluorobenzophenone (or 4-hydroxyindole to 4,4'-difluorobenzophenone) may be (1.3~1.7):1.

In addition, in order to accelerate the reaction rate, it is also possible to carry out treatments such as stirring. After the reaction, cooling, filtration, washing, vacuum, drying and the like may be carried out to obtain more pure SPAIKs. Further, the catalyst may be added to the organic solvent. For example, the catalyst may be one or more selected from potassium carbonate, cesium carbonate, potassium tert-butoxide and sodium tert-butoxide.

With sodium cations as an example, the reaction process for the synthesis of the SPAIKs can be as shown in formula (3). Of course, potassium cations can also be used as the cations, the reaction process only need to change Na in formula (3) to K.

The polymer SPAIKs are obtained according to the method of the above-described exemplary embodiment, which with disulfonate-difluorobenzophenone, hydroxyindole and difluorobenzophenone as monomers, and the sulfonate groups of the disulfonate-difluorobenzophenone have metal cations. In addition, the polymers have cross-linking structures which take the interaction between metal cations and π-face of indole groups as the cross-linking sites, and the polymer has good thermosetting properties.

The polymer SPAIKs of an exemplary embodiment may be cast into various materials. For example, to verify the mechanical properties of the material, the polymer may be dissolved in DMSO and casted onto a glass slide by a membrane filter to obtain SPAIKs films. At room temperature, the resulting films are semi-transparent, non-tacky solids. However, the embodiment is not limited thereto.

To more clearly describe the processes of recovering, regenerating or repairing a polymer, and describe the mechanical properties of polymers, polymer films will be used as a specific example in the following describes. Since the types and acidity of the acid are not critical during the recovering process, as long as the acid solution neither oxidizes nor corrodes the polymers or the damaged parts of the polymer during the immersing the polymers or the damaged parts of the polymer. Therefore, dilute sulfuric acid with pH=2 is chosen as an example to describe the processes of recovering, regenerating or repairing the polymer SPAIKs. Since the types of metal cations can directly influence the mechanical properties of the polymer SPAIKs, the stress at break and mechanical properties of SPAIKs films which contains $K^+$ are typical. Therefore, the processes of recovering, regenerating or repairing the polymer SPAIKs will be described with alkaline metal $K^+$ as an example.

Example 1

First, a dilute sulfuric acid solution is prepared with a concentration of 0.005 M at pH=2. Then, a SPAIKs film was immersed in this sulfuric acid solution for 4 h, followed by washing with deionized water several times and then drying in vacuum to obtain an acid-treated SPAIKs film.

Figure 2:
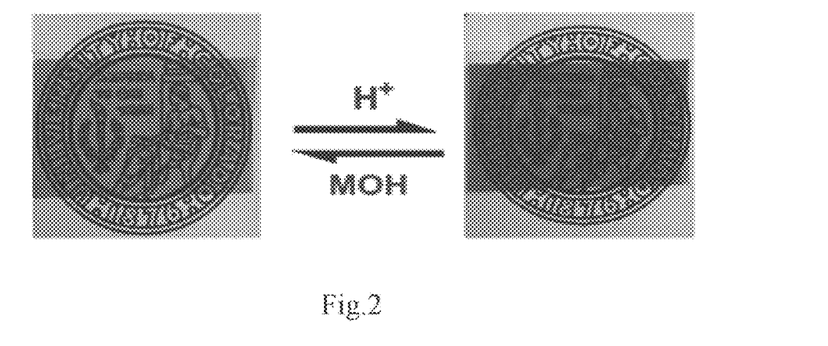
FIG. 2 shows photographs of a polymer film in sunlight after immersing in solutions at pH=2 and pH=12 for 4 h, respectively.
Figure 3:
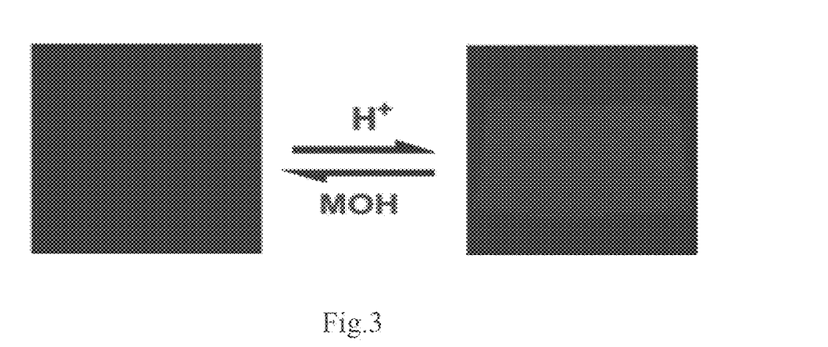
FIG. 3 shows photographs of the polymer film irradiated by UV light at 365 nm after immersing in solutions at pH=2 and pH=12 for 4 h, respectively.

As shown in FIGS. 2 and 3 and Tab. 1, when immersed the SPAIKs film in the sulfuric acid solution at pH=2 for 4 h, macroscopic properties were changed: (i), their color was darkened; (ii), the acid-treated SPAIKs film was soluble in many organic solvents, and (iii), the acid-treated SPAIKs film emitted blue fluorescence under UV light. Tab. 1 Solubility of SPAIKs and acid-treated SPAIKs at different temperatures and in different organic solvents.

| Sample | DMAc | DMSO | DMF | NMP | THF | Chloroform |
|---|---|---|---|---|---|---|
| SPAIKs | − − | − − | − − | − − | − − | − − |
| Acid-treated SPAIKs | + + | + + | + + | + + | − − | − − |

Specifically, "+ +": The polymer can be completely dissolved at room temperature; "− −": the polymer was insoluble at both room temperature and 50° C.; "+ −": the polymer can only be dissolved at 50° C.

Figure 4:
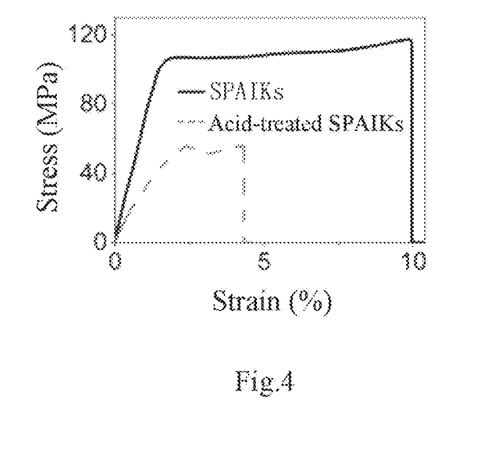
FIG. 4 shows Stress-strain curves of the polymer film before and after immersing in solution at pH=2 for 4 h, respectively.
Figure 5:
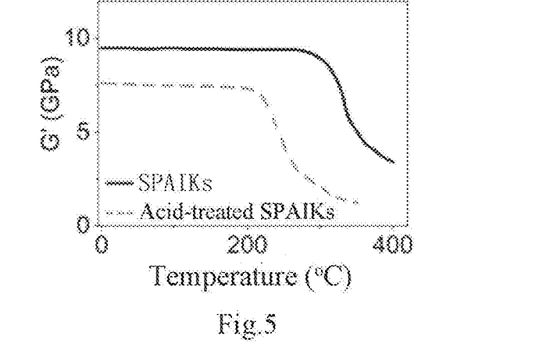
FIG. 5 shows Young's modulus curves of the polymer film before and after immersing in solution at pH=2 for 4 h, respectively.
Figure 6:
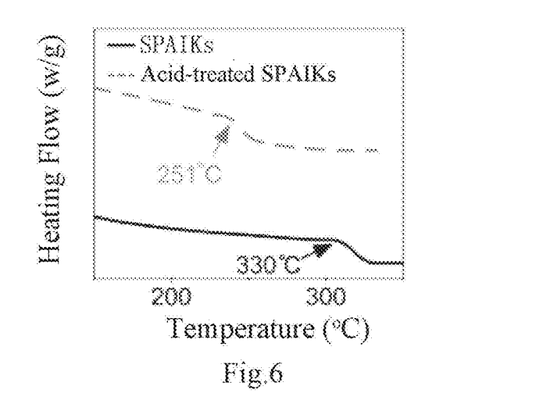
FIG. 6 shows the thermal analysis curves of the polymer film before and after immersing in solution at pH=2 for 4 h, respectively.

As shown in FIG. 4 through FIG. 6, the mechanical properties and thermodynamic properties of the SPAIKs film and the acid-treated SPAIKs film were tested. Before acid treatment, the SPAIKs film has a very high stress at break (~119 MPa) and Young's modulus (~9 GPa) at room temperature. Furthermore, by differential scanning calorimetry (DSC) analysis, the glass transition temperature of SPAIKs film is about 330° C. When the metal cations of the polymer are replaced by protons, that is, after acid treatment, the acid-treated SPAIKs film has lower mechanical properties which stress at break (~58 MPa) and Young's modulus (~7.5 GPa). By differential scanning calorimetry (DSC) analysis, the glass transition temperature of the acid-treated SPAIKs film decreases and is about 251° C.

Figure 13:
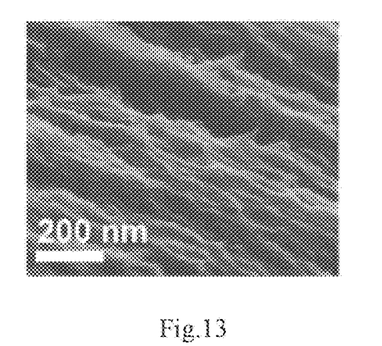
FIG. 13 shows a Scanning electron microscopy (SEM) image of the polymer film before acid treatment at pH=2.
Figure 14:
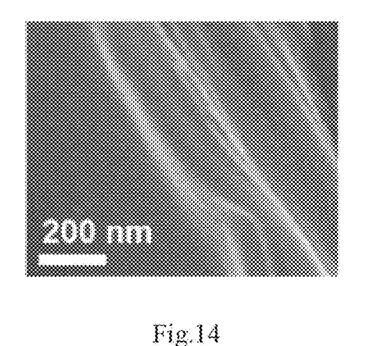
FIG. 14 shows a SEM image of the polymer film after acid treatment at pH=2.
Figure 15:
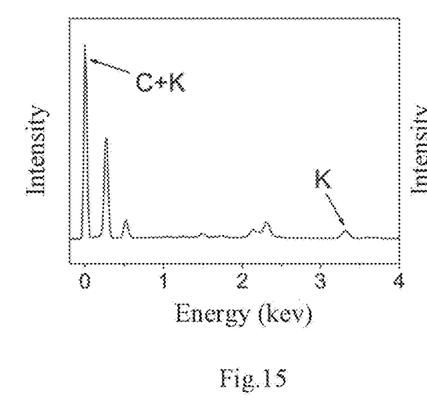
FIG. 15 shows an Energy-dispersive X-ray spectroscopy (EDS) image of the polymer film before acid treatment at pH=2.
Figure 16:
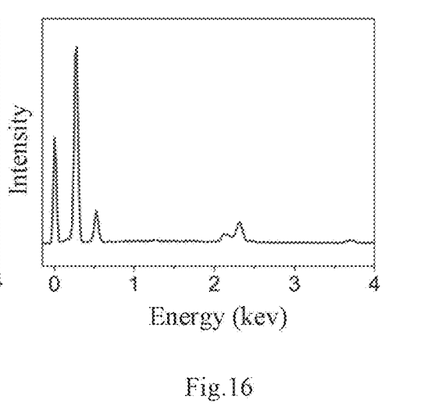
FIG. 16 shows an EDS image of the polymer film after acid treatment at pH=2.

FIGS. 13 and 14 show Scanning electron microscopy (SEM) images of the SPAIKs film before and after acid treatment at pH=2. The SEM images indicate that fracture mechanism changed from the original ductile fracture to the brittle fracture. FIGS. 15 and 16 show Energy-dispersive X-ray spectroscopy (EDS) images of the SPAIKs film before and after acid treatment at pH=2. Peaks at 3.4 keV and 0 keV correspond to potassium in FIG. 15 that however, is missing at the corresponding energy position in the EDS spectrum of FIG. 16. These observations indicated that potassium cations were dissociated from the sulfonate groups when immersed in an acidic solution.

Example 2

First, a dilute sulfuric acid solution was prepared with a concentration of 0.005 M at pH=2. Then, a SPAIKs film was immersed in this sulfuric acid solution for 4 h, followed by washing with deionized water several times and then drying in vacuum to obtain an acid-treated SPAIKs film. Second, a Potassium hydroxide (KOH) dilute solution was prepared with a concentration of 0.001 M at pH=12. Then, the acid-treated SPAIKs film was immersed in this Potassium hydroxide solution for 4 h, followed by washing with deionized water several times and then drying in vacuum to obtain a base-treated SPAIKs film.

As shown in FIGS. 2 and 3, when immersed the acid-treated SPAIKs film in the Potassium hydroxide solution at pH=12 for 4 h, macroscopic properties were changed: (i) their color was lighted; (ii) the base-treated SPAIKs film didn't emit blue fluorescence under UV light.

Figure 7:
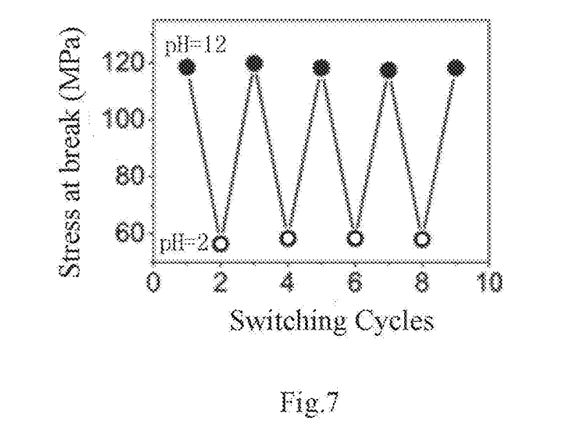
FIG. 7 shows a photograph of the stress at break of the polymer film reversibility immersed in solutions at pH=2 and pH=12 for 4 h.

The SPAIKs film was immersed in the acid solution and alkaline solution for several recovery treatment and regeneration treatment, and tested its mechanical properties. When the SPAIKs film was alternatively immersed in aqueous solutions having pH=2 and 12, the variation of the stress at break is shown in FIG. 7. The stress at break is about 58 MPa after acid treatment at pH=2; the stress at break is about 119 MPa after alkaline treatment at pH=12. By several recovery treatment and regeneration treatment, the stress-strain behavior of The SPAIKs film is almost the same.

Example 3

Figure 9:
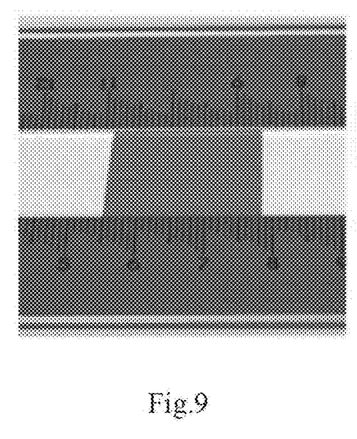
FIG. 9 shows a photograph of the polymer film with a well-defined cut.
Figure 10:
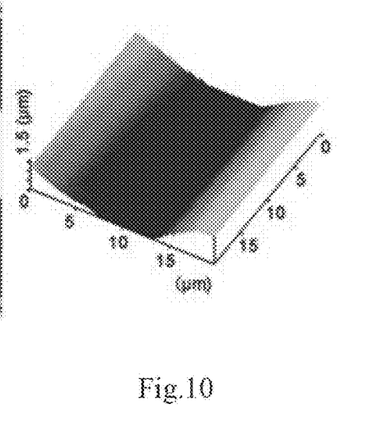
FIG. 10 shows an Atomic Force Microscopy (AFM) image of the polymer film with a well-defined cut.

A cut with thickness of approximately 1 mm on a SPAIKs film was created by a razor blade. The photograph of the polymer film with the cut is shown in FIG. 9, and the Atomic Force Microscopy (AFM) image of the polymer film with the cut is shown in FIG. 10. And the cut of the SPAIKs film was immersed in the sulfuric acid solution at pH=2 for 4 h.

Figure 11:
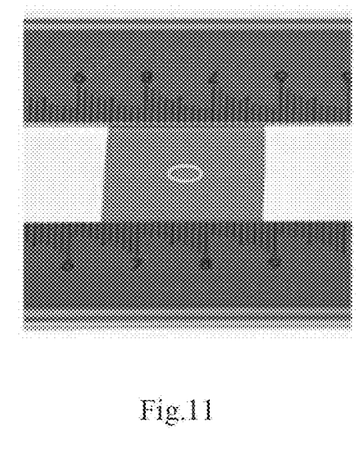
FIG. 11 shows a photograph of the polymer film with a well-defined cut (inside the white circle hole) after repairing.
Figure 12:
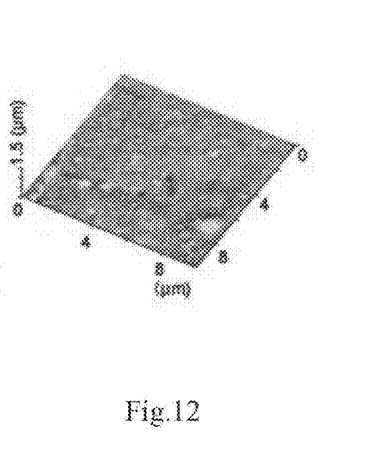
FIG. 12 shows an AFM image of the polymer film with a well-defined cut (inside the white circle hole) after repairing.

Subsequently, placed droplets of DMSO on the cut, and the cut of the SPAIKs film was dissolved. The cut heals upon after the solvent evaporation. And then immersing the cut of the SPAIKs film in the Potassium hydroxide solution at pH=12 for 4 h, a healing SPAIKs film was reconstructed by solution casting. The photograph of the polymer film with the cut (inside the white circle hole) after repairing is shown in FIG. 11, and the AFM image of the polymer film with the cut (inside the white circle hole) after repairing is shown in FIG. 12.

Figure 8:
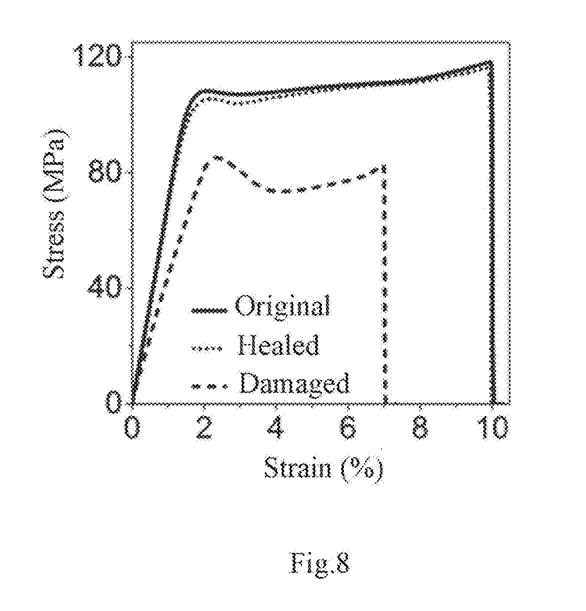
FIG. 8 shows stress-strain curves of the polymer film for original, damaged, and completely repaired samples.

Before and after repairing, the performances of the material are shown in FIG. 8. It can be seen that the mechanical properties of the material are almost the same.

In summary, the methods of recovering, regenerating or repairing a polymer are simple in operation and easy to implement, which have high industrialization significance. The methods replace the metal cations with hydrogen ions to realize the recovery of the polymers and reduce the environmental pollution. The regeneration of polymers is realized by replacing the hydrogen ions with the metal cation and realizes resource recycling. Through local repair, the service life of the product of polymers can prolong. Furthermore, after regeneration treatment, polymers can revert to a level comparable to their original mechanical properties.

This written description uses examples of the subject matter disclosed to enable any person skilled in the art to practice the same, including making and using any devices or systems and performing any incorporated methods. The patentable scope of the subject matter is defined by the claims, and can include other examples that occur to those skilled in the art. Such other examples are intended to be within the scope of the claims. The above-described embodiments are intended to be illustrative in all respects, rather than restrictive, of the embodiments. Thus, the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items. All United States patents and applications, foreign patents, and publications discussed above are hereby incorporated herein by reference in their entireties.

What is claimed is:

1. A method of recovering a polymer comprising the steps of:
    obtaining an acid-treated polymer by immersing a polymer in an acid solution; and
    replacing metal cations of the polymer with hydrogen ions of the acid solution, wherein the polymer has a structural formula as shown below:

wherein ⊕ represents a metal cation, m is in the range of 1~100, and n is in the range of 200~400.

2. The method of claim 1, wherein the polymer is composed of disulfonate-difluorobenzophenone, hydroxyindole and difluorobenzophenone as monomers, and the sulfonate groups of the disulfonate-difluorobenzophenone have metal cations.

3. A method of regenerating a polymer, comprising the steps of:
    immersing a polymer in an acid solution, so that hydrogen ions of the acid solution replace metal cations of the polymer to obtain an acid-treated polymer; and
    immersing the acid-treated polymer in an alkaline solution to obtain a base-treated polymer, wherein the polymer has a structural formula as shown below:

wherein ⊕ represents a metal cation, m is in the range of 1~100, and n is in the range of 200~400.

4. The method of claim 3, wherein the polymer is composed of disulfonate-difluorobenzophenone, hydroxyindole and difluorobenzophenone as monomers, and the sulfonate groups of the disulfonate-difluorobenzophenone have metal cations.

5. A method of repairing a polymer, comprising the steps of: immersing damaged parts of a polymer in an acid solution; replacing metal cations of damaged parts of the polymer with hydrogen ions in the acid solution; dissolving the damaged parts of the polymer in an organic solvent, healing the damaged parts of the polymer after organic solvent evaporation; and repairing the damaged parts of the polymer by soaking in an alkaline solution, wherein the polymer has a structural formula as shown below:

12. The method of regenerating a polymer according to claim 11, wherein the alkali metal cations are one or more selected from the group consisting of $K^+$, $Na^+$ and $Li^+$.

13. The method of regenerating a polymer according to claim 3, wherein the polymer shows cross-linking structures, and the cross-linking structures are achieved by the interaction between metal cations and x-face of indole groups.

14. The method of regenerating a polymer according to claim 3, wherein the acid solution does not oxidize nor corrode the polymer during the process of immersing the polymer.

15. The method of regenerating a polymer according to claim 3, wherein the alkali solution includes one or more compound selected from sodium hydroxide, potassium hydroxide, lithium hydroxide, rubidium hydroxide and cesium hydroxide.

wherein ⊕ represents a metal cation, m is in the range of 1~100, n is in the range of 200~400.

6. The method of claim 5, wherein the polymer is composed of disulfonate-difluorobenzophenone, hydroxyindole and difluorobenzophenone as monomers, and the sulfonate groups of the disulfonate-difluorobenzophenone have metal cations.

7. The method of recovering a polymer according to claim 1, wherein the metal cations are alkaline metal cations.

8. The method of recovering a polymer according to claim 7, wherein the alkali metal cations are one or more selected from the group consisting of $K^+$, $Na^+$ and $Li^+$.

9. The method of recovering a polymer according to claim 1, wherein the polymer shows cross-linking structures, and the cross-linking structures are achieved by the interaction between metal cations and x-face of indole groups.

10. The method of recovering a polymer according to claim 1, wherein the acid solution does not oxidize nor corrode the polymer during the process of immersing the polymer.

11. The method of regenerating a polymer according to claim 3, wherein the metal cations are alkali metal cations.

16. The method of repairing a polymer according to claim 5, wherein the metal cations are alkaline metal cations.

17. The method of repairing a polymer according to claim 16, wherein the alkali metal cations are one or more selected from the group consisting of $K^+$, $Na^+$ and $Li^+$.

18. The method of repairing a polymer according to claim 5, wherein the polymer shows crosslinking structures, and the cross-linking structures may be achieved by the interaction between metal cations and x-face of indole groups.

19. The method of repairing a polymer according to claim 5, wherein the alkaline solution includes one or more selected from sodium hydroxide, potassium hydroxide, lithium hydroxide, rubidium hydroxide, and cesium hydroxide.

20. The method of repairing a polymer according to claim 5, wherein the organic solvent includes one or more selected from dimethylacetamide, dimethylformamide, N-methyl-2-pyrrolidone, Tetrahydrofuran and chloroform.

* * * * *